United States Patent
Marple

(10) Patent No.: US 6,701,320 B1
(45) Date of Patent: Mar. 2, 2004

(54) SYSTEM AND METHOD FOR DETERMINING A CHARACTER ENCODING SCHEME

(75) Inventor: Darin R. Marple, Austin, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 10/152,715

(22) Filed: May 22, 2002

Related U.S. Application Data

(60) Provisional application No. 60/375,276, filed on Apr. 24, 2002.

(51) Int. Cl.[7] .............................................. G06F 17/30
(52) U.S. Cl. ...................................................... 707/100
(58) Field of Search .......................... 707/5, 103, 10; 704/9, 1; 712/300; 709/219

(56) References Cited

U.S. PATENT DOCUMENTS

| | | | | |
|---|---|---|---|---|
| 5,923,878 A | * | 7/1999 | Marsland ..................... | 717/139 |
| 6,049,869 A | * | 4/2000 | Pickhardt et al. ........... | 712/300 |
| 6,321,192 B1 | * | 11/2001 | Houchin et al. ............... | 704/9 |
| 6,400,287 B1 | * | 6/2002 | Ehrman ......................... | 341/55 |
| 6,421,680 B1 | * | 7/2002 | Kumhyr et al. ................. | 707/6 |
| 6,438,516 B1 | * | 8/2002 | Davis ............................ | 704/8 |
| 6,539,118 B1 | * | 3/2003 | Murray et al. .............. | 382/229 |

* cited by examiner

*Primary Examiner*—Safet Metjahic
*Assistant Examiner*—Sana Al-Hashemi
(74) *Attorney, Agent, or Firm*—Gray Cary Ware & Freidenrich, LLP

(57) ABSTRACT

The present invention provides a system and method for determining an appropriate (e.g., best-fit) character encoding scheme including the steps of (i) generating a set of reference characters based on a reference character encoding scheme and a first set of bytes; (ii) generating a set of test characters based on a test character encoding scheme and said first set of bytes; (ii) generating a set of test bytes based on said test character encoding scheme and said set of test characters; (iv) generating a set of comparison characters based on said reference character encoding scheme and said set of test bytes; and (v) comparing said set of reference characters to said set of comparison characters. In one embodiment of the present invention, the aforementioned steps are implemented as a JAVA based software program with Unicode (e.g., USC2) as the reference character encoding scheme. The present invention can determine the degree of match between the reference character encoding scheme and the test character encoding scheme. If the degree of match is within a predefined threshold, the test character encoding scheme can be selected as the character encoding scheme for a particular set of bytes or can be saved for comparison with other test character encoding schemes.

50 Claims, 3 Drawing Sheets

SYSTEM AND METHOD FOR DETERMINING A CHARACTER ENCODING SCHEME

RELATED APPLICATIONS

The present application claims priority under 35 U.S.C. §119(e) to U.S. provisional patent application Ser. No. 60/375,276, filed Apr. 24, 2002, entitled "Character Encoding Detection System and Method" by Darin R. Marple, which is hereby fully incorporated by reference.

TECHNICAL FIELD OF THE INVENTION

The present invention relates generally to character encoding systems and methods. More particularly, the present invention relates to systems and methods for determining the appropriate or best fit character encoding scheme for a set of data.

BACKGROUND OF THE INVENTION

The use of computer networks, particularly the Internet, to store data and provide information to users is becoming increasingly common. The Internet is a loosely organized network of computers spanning the globe. Client computers, such as home computers, can connect to other clients and servers on the Internet through a regional Internet Service Provider ("ISP") that further connects to larger regional ISPs or directly to one of the Internet's "backbones." Regional and national backbones are interconnected through long range data transport connections such as satellite relays and undersea cables. Through these layers of interconnectivity, each computer connected to the Internet can connect to every other (or at least a large percentage) of other computers on the Internet.

The Internet is generally arranged on a client-server architecture. In this network model, client computers request information stored on servers and servers find and return the requested information to the client computer. The server computers can store a variety of data types and provide a number of services. For example, servers can provide telnet, ftp (file transfer protocol), gopher, smtp (simple mail transfer protocol) and world wide web services, to name a few. In some cases, any number of these services can be provided by the same physical server over different ports (i.e., world wide web content over port 80, email over port 25, etc.). If a server makes a particular port available, client computers can connect to that port from virtually anywhere on the Internet, leading to global connectivity between computers.

For typical Internet users, the world wide web and email (smtp) have become the predominant services utilized. The world wide web was developed to facilitate the sharing of technical documents, but over the past decade the number of information providers has increased dramatically and now technical, commercial and recreational content is available to a user from around the world. The information provided through world wide web services is typically presented in the form of hypertext documents, known as web pages, that allow the user to "click" on certain words and graphics to retrieve additional web pages.

When a user requests a web page, a program known as a web browser can make a request to the appropriate web server (usually after retrieving the IP address for the web server from a name server), the web server locates the web page and transmits the data corresponding to the web page to the client computer as series of ones and zeros (e.g., 00000010000001010001000000001100 . . . ). The web browser must transform the bytes received into recognizable characters for display to the user.

Character encoding schemes provide a mechanism for mapping the retrieved bytes to recognizable characters. In a character encoding scheme, a "coded character set" is a mapping from a set of characters to a set of non-negative integers, with a character being defined within the coded character set if the coded character set contains a mapping from the character to an integer. The integer is known as a "code point" and the character as an "encoded character." A large number of character encoding schemes are defined, many of which are defined by individual vendors, but no standardized character encoding scheme has been adopted universally. The lack of standardization is problematic because an integer that maps to the character "a" in one character encoding scheme may map to "I," a Chinese character, or no character at all in another character encoding scheme. If a web browser receiving web page data uses an incorrect character encoding scheme to display the web page's contents, the contents may appear as unintelligible or meaningless.

In order to properly display a web page, a web browser must determine the appropriate character encoding scheme for that web page. This is typically done by reading a "charset" parameter in the content-type HTTP header of the web page or in a META declaration contained in the web page. Both these mechanisms, however, require that character encoding scheme be defined in the content of the web page itself. For web pages that do not provide this character encoding information, the web browser must attempt to determine the appropriate character encoding scheme through other mechanisms.

Existing web browsers such as Microsoft's® Internet Explorer and Netscapes® Navigator attempt to determine the appropriate character encoding scheme (when the character encoding scheme is not otherwise defined) by defining subsets of character ranges that are unique or special to a given character encoding scheme. For example, the web browser may define 1–3 as corresponding to a first character encoding scheme and 6–9 as corresponding to a second character encoding scheme. If the integers received by the web browser are 4,5, and 8, more of these integers fit in the defined range 6–9 for the second character encoding scheme. Therefore, the web browser could chose that scheme. The web browser can then display characters based on the second character encoding scheme. This process can be inefficient because the web browser must test a large number of ranges and can be inaccurate as the ranges for various character encoding schemes can overlap. Moreover, many character encoding schemes do not use consecutive integers to encode characters and the character encoding scheme may not use a well-defined range of integers to encode characters, leading to the display of incorrect characters by the web browser.

SUMMARY OF THE INVENTION

The present invention provides a character encoding detection system and method that eliminates or substantially reduces disadvantages and problems associated with previously developed character encoding detection systems and methods. More particularly, one aspect of the present invention can be characterized as a method for determining an appropriate (or best-fit) character encoding scheme including the steps of (i) generating a set of reference characters based on a reference character encoding scheme and a first set of bytes; (ii) generating a set of test characters based on a test character encoding scheme and said first set of bytes; (ii) generating a set of test bytes based on said test character encoding scheme and said set of test characters; (iv) generating a set of comparison characters based on said reference character encoding scheme and said set of test bytes; and (v) comparing said set of reference characters to said set of comparison characters. In one embodiment of the present invention, the aforementioned steps are implemented as a JAVA based software program with Unicode (e.g., USC2) as the reference character encoding scheme.

In another embodiment of the present invention, rather than comparing a set of reference characters to a set of comparison characters, the present invention can compare the original set of bytes with the set of test bytes. This embodiment of the present invention can omit generating the reference characters and the comparison characters. Yet another embodiment of the present invention can generate a set of reference integers corresponding to the original set of bytes (and the reference characters) and a set of test integers corresponding to the set of test bytes (and the test characters) and then compare the set of reference integers with the set of test integers. Again, this embodiment of the present invention can optionally omit generating the set of reference characters and the set of comparison characters.

Regardless of whether the test bytes are compared to the original set of bytes, the test integers are compared to the reference integers or the comparison characters are compared to the reference characters, the present invention can determine the degree of match between the reference character encoding scheme and the test character encoding scheme. If the degree of match is within a defined threshold, that test character encoding scheme can be selected as the best-fit character encoding scheme or can be saved for comparison with other test character encoding schemes; if the degree of match is outside a defined threshold, the test character encoding scheme can be rejected, or can also be saved for comparison with other test character encoding schemes.

Embodiments of the present invention provide advantages over previously developed systems and methods for determining character encoding schemes because the present invention can more accurately test character encoding schemes, including those that do not use a continuous series of bytes (or integers) to encode characters.

Additionally, embodiments of the present invention provide an advantage by checking the accuracy of characters generated by a test character encoding scheme against the characters generated by a reference character encoding scheme that has a relatively large encoded character set.

BRIEF DESCRIPTION OF THE DRAWINGS

A more complete understanding of the present invention can the advantages thereof may be acquired by referring to the following description, taken in conjunction with the accompanying drawings in which like reference numbers indicate like features and wherein.

DETAILED DESCRIPTION OF THE INVENTION

Figure 1:
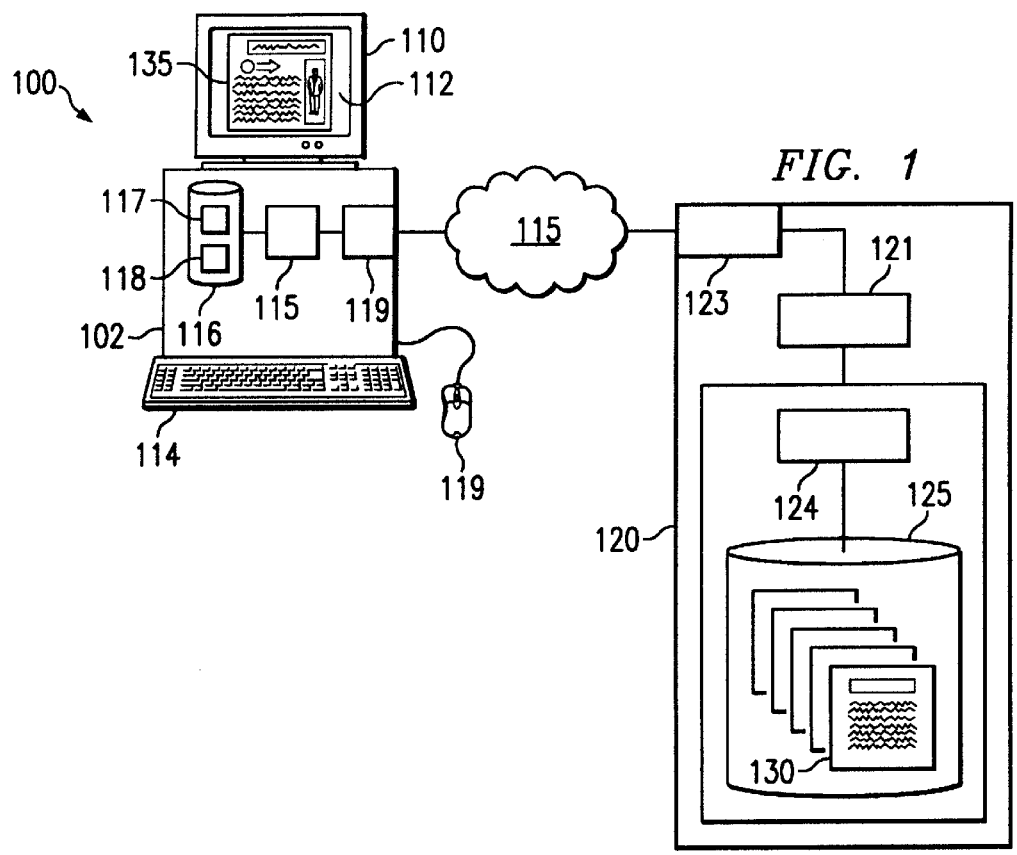
FIG. 1 is a diagrammatic representation of a system for determining the appropriate or best fit character encoding scheme according to one embodiment of the present invention.

Preferred embodiments of the present invention are illustrated in the figures, like numerals being used to refer to like an corresponding parts of the various drawings.

Embodiments of the present invention provide a system and method for determining the best-fit or appropriate character encoding scheme for an electronic document such as a web page, or for a set of web pages (e.g., a web site). Embodiments of the present invention can be implemented as a software program stored on a computer readable medium (e.g., fixed disk, removable disk, distributed network drive, magnetic storage device, optical storage device, RAM, ROM or any other computer readable memory known in the art) and executable by a computer processor to compare the results of applying a test character encoding scheme to a set of bytes with applying a reference character encoding scheme to the same (or duplicate) set of bytes.

For purposes of the present application the term "encoded character set" shall mean a set of characters mapped to a set of integers, an "encoded character" shall mean a character defined in a particular encoded character set and a "character encoding scheme" shall mean a defined mapping from a set of bytes to a set of charters either directly or through the use of integers. The character encoding scheme includes both the defined method of mapping bytes to characters and the underlying character set. Thus, for purposes of the present application, the use of each character set for a particular method of mapping integers (or bytes) to characters shall be considered a different character encoding scheme. For example, several character encoding systems, such as Shift-JIS (used for Japanese characters), use the same method of mapping bytes (or integers) to characters but contain several encoded character sets, and thus would comprise independent character encoding schemes for the purposes of the present application.

FIG. 1 illustrates one embodiment of a system for determining the appropriate or best-fit character encoding detection system according to the present invention. FIG. 1 illustrates a client-server computer system 100 comprising a client computer 110 connected to a server computer 120 via a global computer network 115 (e.g., the Internet, a wireless network or other computer network known in the art). Client computer 110 can comprise a display device 112 (along with a corresponding display adapter), input devices 114 (e.g., mouse and keyboard), a central processing unit (CPU) 113, a computer readable memory 116 (including RAM, ROM, fixed disk drives, removable disk drives, magnetic storage devices, optical storage devices and other computer readable mediums known in the art) storing a web browser 117 and a character encoding detection software program 118 ("encoding detection program 118") and a network I/O device 119 (e.g., a NIC, a cable modem, a DSL modem, an Ethernet adapter, a wireless network adapter or any other network connection device known in the art). Encoding detection program 118 can be implemented in any suitable programming language including C++, JAVA or any other programming language known in the art and can be implemented as a plug-in module to web browser 117, a subroutine of web browser 118, as a separate program from web browser 118 or in any other manner as would be understood by those of ordinary skill in the art. Server computer 120 (e.g., web server 120) can similarly comprise a central processing unit (CPU) 121, a server memory 122 (including RAM, ROM, fixed disk drives, removable disk drives, magnetic storage devices, optical storage devices and other computer readable mediums known in the art) and a network I/O device 123 as would be known to those of ordinary skill in the art. Sever memory 122 can contain a web server management program 124 and a database 125 of web pages such as web page 130.

In practice, a user can request a particular web page (e.g., web page 130) through a web browser window 135 displayed by display device 112 and using input devices 114. When a user enters a request in web browser window 135, web browser 117 sends the request to web server 120. The process of directing web site requests to the appropriate web server is well-known in the art. Based on the request, web server management program 124 can retrieve web site 130 from database 125 and communicate the contents of web site 130 to user computer 110 via global computer network 115. Web browser 117 can display the contents of web site 130 in browser window 135 for the user's review.

When web browser 117 receives the contents of web page 130, web browser 117, in one embodiment of the present invention, can attempt to determine the appropriate character encoding scheme from the "charset" parameter of the content-type header (e.g., Content-Type: text/html; charset=EUC-JP)or from a META declaration (e.g., <META http-equiv="Content-Type" content="text/html; charset=EUC-JP">) contained in the contents of web page 130. If, however, web browser 117 can not determine the character encoding scheme (e.g., from a content-type header or META declaration) encoding detection program 118 can determine the appropriate, e.g., a best-fit, character encoding scheme (and corresponding character set) for web page 130. After determining the appropriate character encoding scheme for web page 130, encoding detection program 118 can forward content-type header, META declaration or other indicator of the character encoding scheme to web browser 117.

Figure 2:
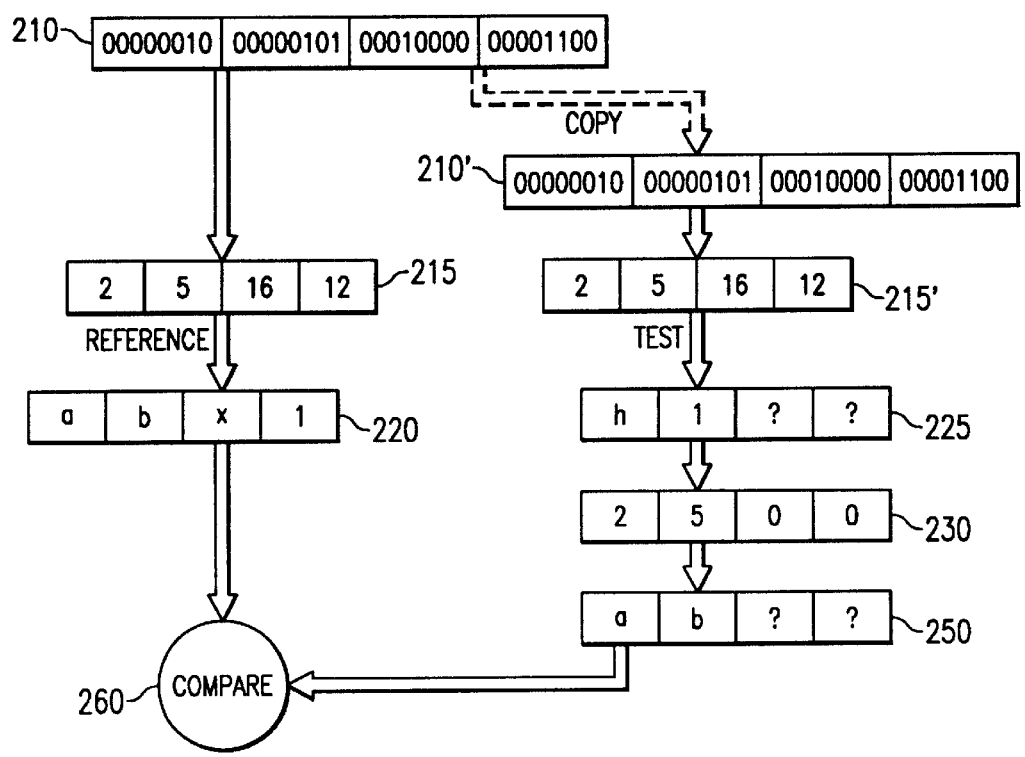
FIG. 2 is a diagrammatic representation illustrating the processing of data that can occur according to one embodiment of the present invention.

FIG. 2 illustrates one embodiment of the data manipulation that can be carried out by encoding detection program 118 in determining the appropriate (or best-fit) character encoding scheme for web page 130. As would be understood by those of ordinary skill in the art, the data corresponding to web page 130 is transported across global computer network 115 as a series of bits. An example binary (i.e., base 2) bit stream for web page 130 can be as follows: 00000010000001010001000000001100. Character encoding detection program 118 can receive this bit stream and convert the received bits into byte array 210.

As shown in FIG. 2, encoding detection program 118 can optionally convert byte array 210 into a corresponding numerical array 215. Encoding detection program 118 can further generate a reference character array 220 from either byte array 210 or numerical array 215 using a reference character encoding scheme. As will be explained below, the reference character array can be used as a check for other character encoding schemes. As an example of generating a reference array, the integer 2 can map to the character "a", the integer 5 can map to the encoded character "b", the integer 16 can map to the character "x", and the integer 12 can map to the character "I" (i.e., a, b x and I are encoded characters for the reference character encoding schemes of this example) to create reference character array 220. Alternatively, embodiments of encoding detection program 118 can generate reference character array 220 directly from byte array 210 using the reference character encoding scheme and without creating the intermediate numerical array 215.

In the preferred embodiment of the present invention, the reference character encoding scheme comprises a character encoding scheme that maps all or a large number of characters to integers, such as Unicode (USC2). When numerical array 215 (or byte array 210) is converted into reference character array 220 using Unicode, it is unlikely (or at least less likely as compared to the use of other reference character encoding schemes) that a character in reference character array 220 will be undefined. Because reference character array 220 provides a basis of comparison for character arrays generated using test character encoding schemes, a decrease in the number of undefined characters in the reference character array increases,the accuracy of some embodiments of the present invention. The present invention is not, however, limited to the use of Unicode as the reference character encoding scheme and the reference character encoding scheme can comprise any known or defined character encoding scheme, however, it is preferred that the reference map all or a significant number of characters to integers.

To determine if a particular character encoding scheme is the appropriate (e.g., best-fit) character encoding scheme for web page 130, encoding detection program 118 can optionally copy byte array 210 to create duplicate byte array 210'. This can be done to preserve data integrity and to ensure that the original byte array 210 is not changed. Encoding detection program 118 can then convert duplicate byte array 210' into the corresponding duplicate numerical array 215' and generate test character encoding array 225 from duplicate numerical array 215' using a test character encoding scheme. Again, however, it should be noted that other embodiments of the present invention can create test character array 225 directly from duplicate byte array 210', without creating an intermediate duplicate numerical array 215', or can derive test character array 225 directly from byte array 210, without copying byte array 210 to form duplicate byte array 210'. Yet an other embodiment of the present invention can simply copy numerical array 215 to create duplicate numerical array 215', without copying byte array 210; this embodiment can then generate test character array 230 from duplicate numerical array 215'.

Continuing with the example, using the test character encoding scheme, the integer 2 maps to the character "h", the integer 5 maps to the character "I" and the integers 16 and 12 are undefined to create test character array 225 (i.e., h and I are encoded characters for this test character encoding scheme). The present invention can then "round-trip" test character array 225 by decoding the characters using the test character encoding scheme and mapping undefined characters to an arbitrary error integer (or byte). Continuing the example using test character array 225, "h" maps to the integer 2, "I" maps to the integer 5 and the two undefined characters can map to 0 (indicating no match) to create test numerical array 230. In another embodiment of the present invention, test character array 225 can be mapped to a test byte array (not shown) using the test character encoding scheme. Using the same example, the character "h" could map to the byte 00000010, the character "I" could map to the byte, 00000101, and the undefined characters can map to an arbitrary error byte, such as 00000000.

Referring again to FIG. 2, encoding detection program 118 of the present invention can now compare the test character encoding scheme to the reference character encoding scheme at step 260 to determine if the test character encoding scheme is the appropriate or best-fit character encoding scheme for web page 130. The present invention, as shown in FIG. 2, can convert test numerical array 230 (or the corresponding test byte array) into comparison character array 250 using the reference character encoding scheme. In the example of FIG. 2, the integer 2 could map to "a", the integer "5" could map to "b" and error integers could map to an error character or some other character defined by the reference character encoding scheme (represented by "?"). This embodiment of the present invention can then compare comparison character array 250 with reference character array 220 to determine if the values in the two arrays match.

In another embodiment, the present invention can compare the test byte array to byte array 210 (or duplicate array 210') to determine if all the bytes match; in another embodiment, the present invention can compare test numerical array 230 to numerical array 215 (or duplicate numerical array 215') to determine if all the integers match. However, as would be understood by those of ordinary skill in the art, if encoding detection program 118 is implemented using JAVA the comparison of character arrays can be more efficient than comparing numerical or byte arrays because JAVA can more easily compare string values than other data types. Moreover, the use of arrays to compare data can be highly efficient in many programming languages, though other embodiments of the present invention can use other data structures to compare bytes, integers and/or characters.

In these examples, whether comparing the test byte array to byte array 210, test numerical array 230 to numerical array 215 or comparison character array 250 with reference character array 220, two of the array entries will not match (the two unknown characters). This result (with two of four non-matching entries) suggests that web page 130 was likely not encoded using the test character encoding scheme (50% match is not very high). Rather than simply rejecting the particular test character encoding scheme, however, the present invention can determine the degree of match (e.g., on a percentage basis, on the number of actual errors or a statistical indicator of error). Depending on whether the degree of match is within a certain threshold (e.g., only 1% errors, only 1 character missed, etc.), which can be arbitrarily defined, the test character encoding scheme and the degree of fit can be (1) accepted and used, (2) rejected or (3) saved for comparison with other test character encoding schemes. The present invention can then test other known test character encoding schemes (if the other known or defined encoding schemes have not yet been tested) until an exact or better match is found. Alternatively, the present invention can compare the degree of match for various test character encoding schemes and select the best fit scheme.

Figure 3:
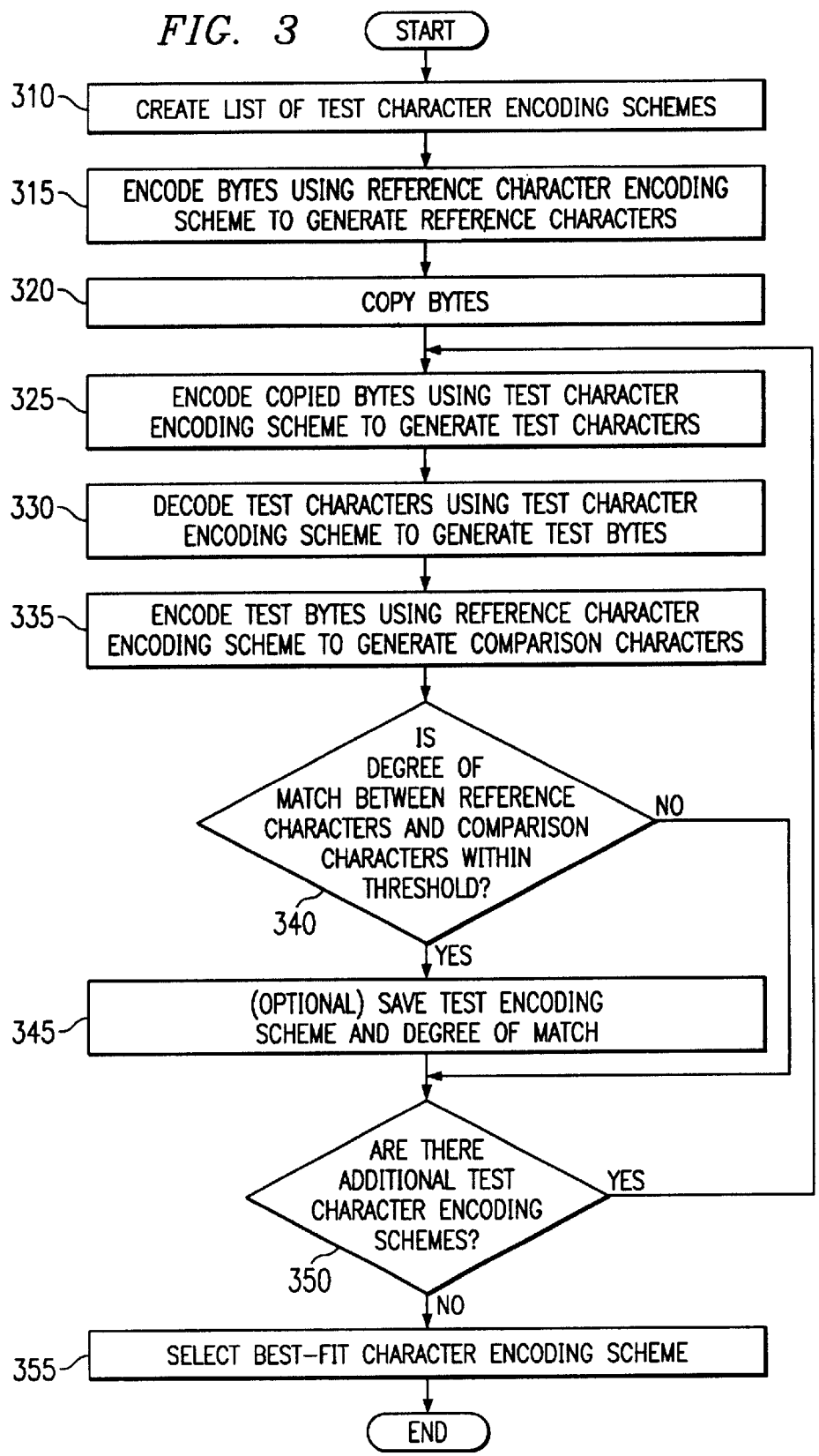
FIG. 3 is a flow chart illustrating one embodiment of a method for determining the appropriate or best fit character encoding scheme.

FIG. 3 is a flow chart illustrating one method for detecting the appropriate or best fit character encoding scheme according to one embodiment of the present invention. At step 310, encoding detection program 118 can generate (e.g., from memory 116 or remote memory) a list of possible character encoding schemes for a set of received bytes (e.g., byte array 210) or can present a user with a menu (e.g., a pop-up or pull-down menu) of character encoding schemes in web browser window 135 and allow the user to select the test character encoding schemes. For example, if the user knows that he or she is requesting a Japanese page, the user can select only Japanese character encoding schemes for testing. Alternatively, the list of test character encoding schemes can include all the character encoding schemes supported by the programming language in which encoding detection program 118 is implemented. Thus, for example, if encoding detection program 118 is implemented in JAVA, the list of test character encoding schemes can include all the character encoding schemes supported by JAVA. In fact, the use of JAVA can be advantageous as Sun Microsystems® updates the character encoding schemes supported by JAVA and makes this information freely available.

At step 315, encoding detection program 118 can encode all or some portion the received bytes corresponding to web page 130 using a reference character encoding scheme, such as USC2. Encoding can be achieved by converting byte array 210 into a character array 220, converting byte array 210 into numerical array 215 and generating character array 220 from numerical array 220 or any other method of converting a series of bytes into a series of characters as would be known to those of ordinary skill in the art. Using the example from FIG. 2, the reference character encoding scheme can encode the received bytes into the reference characters a, b, x and I.

At step 320, encoding detection program 118 can copy the received bytes (or the portion of received bytes selected for encoding) to create, for example, duplicate byte array 210', and, at step 325, encode the copied bytes (e.g., duplicate byte array 210') using one of the test character encoding schemes selected at step 310. Again, using the example from FIG. 2, the copy of the received bytes can be converted into the test characters h, I, ?, ? using the selected test character encoding scheme.

After deriving the test character encoding scheme, encoding detection program 118, at step 330, can decode the test characters using the test character encoding scheme to derive a set of test bytes (e.g., in the form of a test byte array). This takes advantage of the fact that many character encoding schemes lack inverse mappings for many bytes (or integers) and arbitrarily defined error bytes can be generated (e.g., "00000000") when undefined characters are mapped back to bytes. For example, the test characters h, I, ?, ? (as illustrated in test character array 225) could map back to the test bytes 00000010, 00000101, 00000000, 00000000 (or to a series of test integers as depicted by test numerical array 230 of FIG. 2).

At step 335, encoding detection program 118 can encode the test bytes derived at step 330 using the reference character encoding scheme to create a series of comparison characters. Again, continuing with the previous example, the comparison characters derived using the reference character encoding scheme can be "a," "b," ?, ? (e.g., comparison array 250). Encoding detection program 118, at step 340, can then compare the comparison characters generated at step 335 with the reference characters generated at step 315 to determine if the degree of match is within a defined (e.g., predefined or user defined) threshold.

The degree of match can be determined by comparing the number of matching/non-matching characters, the percentage of matching/non-matching characters or any other statistical indicator of match known in the art. In one embodiment of the present invention, if the same character appears multiple times in the reference characters but there is no matching character in the set of comparison characters, only one error is counted. For example, if the character "x" appears twice in the set of reference characters but there is no matching "x" in the set of comparison characters for either "x" in the set of reference characters, only one error will be counted. This prevents double counting of what is essentially the same error inasmuch as the test character encoding scheme does not contain an encoded character for the byte corresponding to "x" in the reference character encoding scheme.

If, at step 340, encoding detection program 118 determines that the degree of match is within a certain threshold (e.g., less than 1% errors), encoding detection program 118 can (i) save the test character encoding scheme information and degree of match for comparison With later test character encoding schemes (step 345) and proceed to step 350; or (ii) directly select the test character encoding scheme to encode the contents of web page 130 (step 355). If at step 340 encoding detection program 118 determines the degree of match is not within the defined threshold, it can reject the test character encoding scheme and proceed to step 350. At optional step 350, encoding detection program 118 can determine whether there are additional test character encoding schemes that can be tested. If so, encoding detection program 118 can repeat steps 325–350 for each additional test character encoding scheme.

From the possible character encoding schemes saved at step 345 during each iteration, encoding detection program 118 can select the appropriate (e.g., best-fit) character encoding scheme based on the degree of match for each character encoding scheme. Alternatively, character encoding detection program 118 can present a list of character encoding schemes to the user (through a pop up window, for example) and allow the user to select the appropriate character encoding scheme. At step 355, encoding detection program 1.18 can return the appropriate (e.g., best-fit) character encoding scheme to web browser 117 by, for example, inserting a content-type header or META declaration into the contents of web page 130.

Thus, the present invention can receive a bit stream corresponding to a web page, encode the received bytes into a set of reference characters using a reference character encoding scheme (step 315), encode the received bytes (or a copy of the received bytes) into a set of test characters using a test character encoding scheme (step 325), decode the set of test characters using the test character encoding scheme to generate a set of test bytes (step 330), and re-encode the set of test bytes using the reference character encoding scheme to derive a set of comparison characters (step 335). The present invention can then compare the set of comparison characters to the set of reference characters to determine the degree of match. This process can be repeated for multiple test character encoding schemes. Based on the degree of match (or any other defined characteristic) of the test character encoding schemes, one embodiment of the present invention can select the appropriate (e.g., best-fit) character encoding scheme for the received bits and forward this information to a web browser.

While the flow chart of FIG. 3 was discussed in terms of comparing as set of comparison characters with a set of reference characters, embodiments of the present invention can also compare the set of test bytes derived in step 335 to the original set of bytes received. In this embodiment, the present invention can optionally omit converting the original bytes into a set of reference characters (step 315) and converting the test bytes into a set of comparison characters (step 335). Moreover, in another embodiment of the present invention, encoding detection program 118 can rank each test character encoding scheme according to the degree of match, rather than just the character encoding schemes that come within a threshold degree of match.

Figure 4:
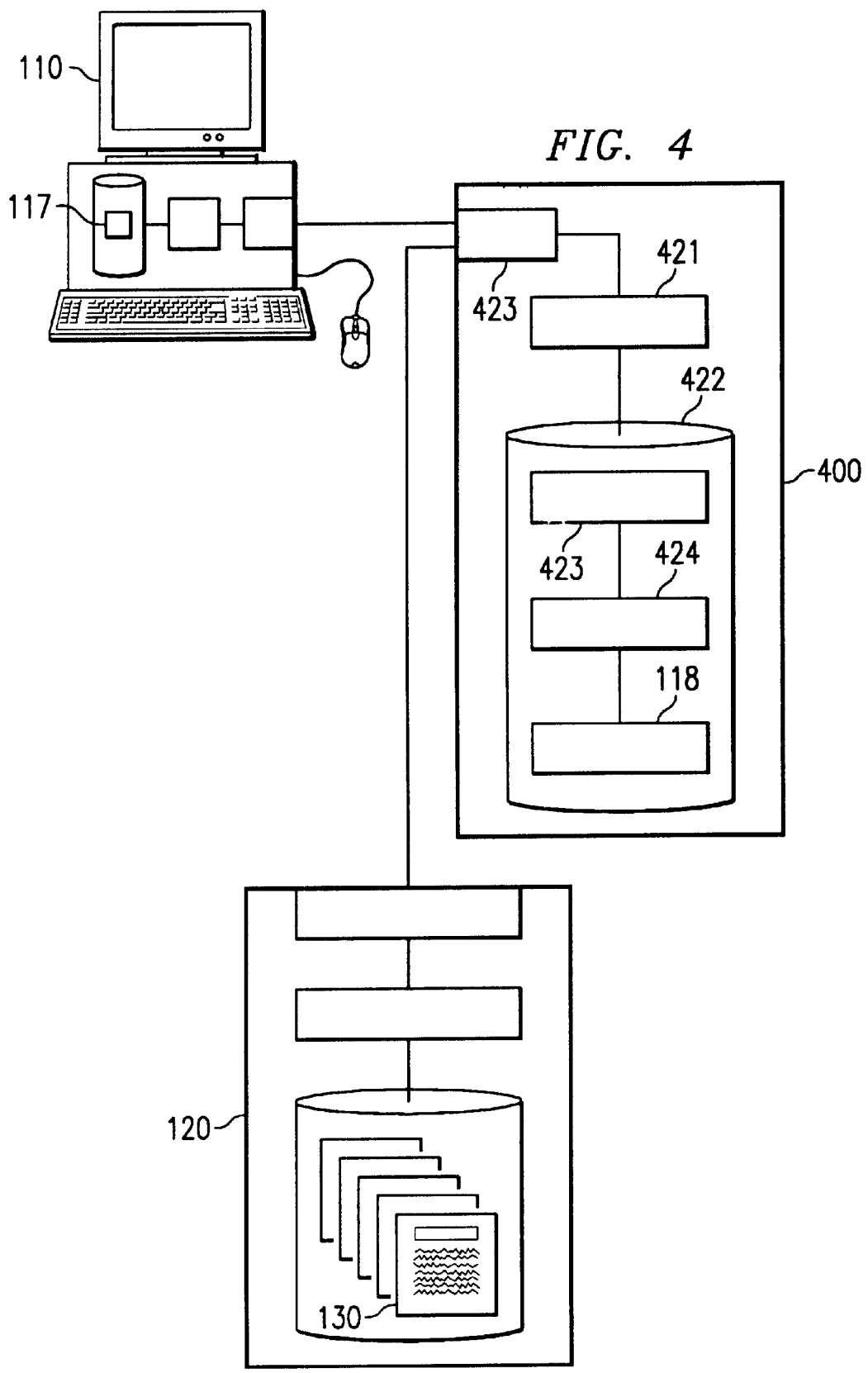
FIG. 4 is a diagrammatic representation of a system for determining the appropriate or best fit character encoding scheme according to another embodiment of the present invention.

While FIG. 1 depicts the encoding detection program 118 co-located with web browser 117, it can alternatively be implemented in a distributed fashion. FIG. 4 illustrates an embodiment of the present invention in which character encoding detection program 118 and web browser 117 are implemented on different computers. In FIG. 4, web browser 117 resides on client computer 110 while encoding detection program 118 resides at an intermediate server 400. Intermediate server 400 can comprise a central processing unit (CPU) 421, a server memory 422 (including RAM, ROM, fixed disk drives, removable disk drives, magnetic storage devices, optical storage devices and other computer readable memories known in the art) and a network I/O device 423 as would be known to those of ordinary skill in the art. Sever memory 422 can contain a web request servlet 423, an interactor program 424 and encoding detection program 118. In the case of FIG. 4, requests for a web site can be sent to intermediate server 400 for further processing. The request can be received by servlet 423 and be forwarded to interactor program 424, which can then forward the request to web server 120 and receive the contents of web page 130 in response. Interactor program 424 can then process web site 144 to produce a processed web site and forward processed web site to client computer 110. The processing performed by interactor program 424 can include, for example, mediation of web page 130's contents so that further requests from client computer 110 are routed through intermediate server 400 as described in U.S. Patent Application Ser. No. 09/710, 214, entitled "A System and Method of Mediating a Web Page" by Walter Bodwell et al, filed Nov. 10, 2000, which is hereby fully incorporated by reference herein. Servlet 423 can process requests from client computer 110 and forward the processed web page contents (e.g., mediated web page 130) to client computer 110.

In the system of FIG. 4, if the appropriate character encoding scheme is not specified in the content of web site 130 (e.g., in a content-type header or META declaration), interactor program 424 can forward the contents of web site 130 to character encoding detection program 118 to determine the appropriate (or best fit) character encoding scheme for web site 130, as described above. Character encoding detection program 118 can then return the appropriate character encoding scheme to interactor program by inserting a content-type header, inserting a META declaration, or through any other indicator as would be known to those of ordinary skill in the art.

As can be understood from the foregoing discussion, the present invention provides a system and method for determining the character encoding scheme for a particular set of data. Although the present invention has been described primarily in terms of determining the appropriate character encoding scheme for web pages, this is not limiting of the present invention, and embodiments of the present invention can be used to determine the appropriate character encoding schemes for other forms of electronic documents.

Although the present invention has been described in detail herein with reference to the illustrative embodiments, it should be understood that the description is by way of example only and is not to be construed in a limiting sense. It is to be further understood, therefore, that the numerous changes in the details of the embodiments of this invention will be apparent to and may be made by persons of ordinary skill in the art having reference to this description. It is contemplated that all such changes in additional embodiments are within the spirit and true scope of this invention as claimed below.

What is claimed is:

1. A method for determining a character encoding scheme comprising:

generating a set of reference characters based on a reference character encoding scheme and a first set of bytes;

generating a set of test characters based on a test character encoding scheme and said first set of bytes;

generating a set of test bytes based on said test character encoding scheme and said set of test characters;

generating a set of comparison characters based on said reference character encoding scheme and said set of test bytes; and comparing said set of reference characters to said set of comparison characters.

2. The method of claim 1, wherein said reference character encoding scheme comprises a reference encoding scheme that will map every set of bytes to a character.

3. The method of claim 1, wherein the reference character encoding scheme is Unicode.

4. The method of claim 1, wherein the step of generating set of reference characters further comprises:

deriving a first set of integers corresponding to said first set of bytes; and generating said set of reference characters based on said reference character encoding scheme and said first set of integers.

5. The method of claim 4, wherein said step of generating said set of test characters further comprises generating said set of test characters based on said first set of integers and said test character encoding scheme.

6. The method of claim 4, wherein the step of generating set of test characters further comprises:

duplicating said first set of integers; and generating said set of test characters from said duplicated first set of integers based on said test character encoding scheme.

7. The method of claim 4, wherein the step of generating said set of test characters further comprises:

duplicating said first set of bytes to create a duplicate set of bytes; and generating said set of test characters based on said test character encoding scheme and said duplicated first set of bytes.

8. The method of claim 1, further comprising determining the degree of match for said first set of comparison characters based on the comparison between said first set of comparison characters and said set of reference characters.

9. The method of claim 8, further comprising selecting said test character encoding scheme if said degree of match for said first set of comparison characters is within a defined threshold.

10. The method of claim 8, further comprising:

generating an additional set of test characters based on an additional test character encoding scheme;

generating an additional set of test bytes based on said additional test character encoding scheme;

generating an additional set of comparison characters based on said reference character encoding scheme and said additional set of test bytes; and comparing said additional set of comparison characters to said set of reference characters to derive a degree of match for said additional set of comparison characters.

11. The method of claim 9, further comprising selecting said test character encoding scheme or said additional character encoding scheme based on a comparison of said degree of match for said test character encoding scheme and said degree of match for said additional character encoding scheme.

12. A method for determining a character encoding scheme comprising:

deriving a set of test characters based on a set of received bytes and a test character encoding scheme;

deriving a set of test bytes based on said set of test characters and said test character encoding scheme; and comparing said set of test bytes to said set of received bytes.

13. The method of claim 12, wherein said reference character encoding scheme comprises a reference character encoding scheme that maps every set of test bytes to a character.

14. The method of claim 12, wherein said reference character encoding scheme comprises Unicode.

15. The method of claim 12, wherein said set of received bytes corresponds to a web page.

16. The method of claim 12, further comprising determining the degree of match for said set of test bytes.

17. The method of claim 16, further comprising:

deriving an additional set of test characters based on said set received bytes and an additional character encoding scheme;

deriving an additional set of test bytes based on said additional set of test characters and said additional character encoding scheme; and comparing said additional set of test bytes to said set of received bytes.

18. The method of claim 16, further comprising determining the degree of match for said additional set of test bytes based on the comparison of said additional set of test bytes and said set of received bytes.

19. The method of claim 14, further comprising selecting a best fit character encoding scheme based on said degree of match said set of test bytes and said degree of match of said additional set of test bytes.

20. A method for determining a character encoding scheme comprising:

deriving a set of reference integers from a set of received bytes;

deriving a set of test characters based on said set of reference integers and a test character encoding scheme;

deriving a set of test integers based on said set of test characters and said test character encoding scheme; and comparing said set of test integers to said set of reference integers.

21. The method of claim 20, wherein said reference character encoding scheme comprises Unicode.

22. The method of claim 20, wherein said reference character encoding scheme comprises a reference character encoding scheme that matches every set of received bytes to a reference integer.

23. The method of claim 20, wherein said set of received bytes corresponds to a web page.

24. The method of claim 20, further comprising determining the degree of match for said set of test integers.

25. The method of claim 20, wherein deriving a set of test characters further comprises:

duplicating said set of reference integers;

deriving said set of test characters based on said duplicated set of reference integers and said test character encoding scheme.

26. The method of claim 25, further comprising:

deriving an additional set of test characters based on said set of reference integers and an additional character encoding scheme;

deriving an additional set of test integers based on said additional set of test characters and said additional character encoding scheme; and comparing said additional set of test integers to said set of reference integers.

27. The method of claim 26, further comprising determining the degree of match for said additional set of test integers based on the comparison of said additional set of test bytes and said set of received bytes.

28. The method of claim 27, further comprising selecting a best fit character encoding scheme based on said degree of match said set of test bytes and said degree of match of said additional set of test bytes.

29. A method for determining a character encoding scheme comprising:
  (a) converting a first set of bytes to a set of reference characters based on a reference character encoding scheme;
  (b) converting said first set of bytes to a set of test characters based on a test character encoding scheme;
  (c) converting said set of test characters to a set of test bytes based on said test character encoding scheme;
  (d) converting said test bytes to a set of comparison bytes based on said reference character encoding scheme;
  (e) comparing said set of reference characters to said set of comparison characters
  (f) repeating steps (b)–(e) for at least one additional test character encoding scheme; and
  (g) selecting a best fit character encoding scheme from the test character encoding scheme and the at least one additional test character encoding scheme.

30. A system for determining a character encoding scheme comprising a software program stored on a computer readable storage medium executable to:
  generate a set of reference characters based on a first set of bytes and a reference character encoding scheme;
  generate a set of test characters based on said first set of bytes and a test character encoding scheme;
  generate a set test bytes corresponding to said set of test characters based on said test character encoding scheme;
  generate a set of comparison bytes based on said set of test bytes and said reference character encoding scheme; and
  compare said set of reference characters to said set of comparison characters.

31. The system of claim 30, wherein said reference character encoding scheme comprises Unicode.

32. The system of claim 30, wherein said reference character encoding scheme comprises a character encoding scheme that maps every set of bytes to a character.

33. The system of claim 30, wherein said software program is further executable to generate said set of reference characters further by:
  generating a first set of integers corresponding to said first set of bytes; and
  generating said set of reference characters based on said reference character encoding scheme and said first set of integers.

34. The system of claim 33, wherein said software program is further executable to generate said set of test characters by:
  duplicating said first set of integers; and
  generating said set of test characters from said duplicated first set of integers based on said test character encoding scheme.

35. The system of claim 33, wherein said software program is further executable to generate said set of test characters by:
  duplicating said first set of bytes to create a duplicate set of bytes; and
  generating said set of test characters based on said test character encoding scheme and said duplicated first set of bytes.

36. The system of claim 30, wherein said software program is further executable to determine the degree of match for said set of comparison characters based on the comparison between said set of comparison characters and said set of reference characters.

37. The system of claim 36, wherein said software program is further executable to select said test character encoding scheme if said degree of match for said set of comparison characters is within a predefined threshold.

38. The system of claim 37, wherein said software program is further executable to forward an indicator of said selected test character encoding scheme to a web browser.

39. The system of claim 30, wherein said software program is implemented at an intermediate server.

40. The system of claim 30, wherein said software program is implemented in JAVA.

41. A system for determining a character encoding scheme comprising a software program stored on a computer readable storage medium executable to:
  derive a set of test characters based on a set of received bytes and a test character encoding scheme;
  derive a set of test bytes based on said set of test characters and said test character encoding scheme; and
  compare said set of test bytes to said set of received bytes.

42. The method of claim 41, wherein said reference character encoding scheme comprises a character encoding scheme that maps each set of received bytes to a character.

43. The method of claim 41, wherein said set of received bytes corresponds to a web page.

44. The method of claim 41, wherein said software program is further executable to determine the degree of match for said set of test bytes compared to said set of reference bytes.

45. The system of claim 44, wherein said software program is further operable to:
  generate an additional set of test characters based on said set received bytes and an additional test character encoding scheme;
  generate an additional set of test bytes based on said additional set of test characters and said additional test character encoding scheme;
  generate said additional set of test bytes to said set of received bytes;
  determine a degree of match for said additional set of test bytes compared to said set of received bytes; and
  select a best fit character encoding scheme from said test character encoding scheme and said additional character encoding scheme.

46. A system for determining a character encoding scheme comprising a software program stored on a computer readable medium executable to:
  derive a set of reference integers from a set of received bytes;
  derive a set of test characters based on a set of reference integers and a test character encoding scheme;
  derive a set of test integers based on said set of test characters and said test character encoding scheme; and
  compare said set of test integers to said set of reference integers.

47. The system of claim 46, wherein said reference character encoding scheme comprises a character encoding scheme that maps every set of received bytes to an integer.

48. The System of claim 46, wherein said set of received bytes corresponds to a web page.

49. The system of claim 46, further comprising determining the degree of match for said set of test integers.

50. The system of claim 46, wherein said reference character encoding scheme comprises Unicode.

* * * * *